United States Patent
Boyd et al.

(10) Patent No.: US 7,877,628 B2
(45) Date of Patent: Jan. 25, 2011

(54) MIRRORING DATA BETWEEN PRIMARY AND SECONDARY SITES

(75) Inventors: Kenneth Wayne Boyd, Tucson, AZ (US); Kenneth Fairclough Day, III, Tucson, AZ (US); Douglas William Dewey, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 11/423,103

(22) Filed: Jun. 8, 2006

(65) Prior Publication Data

US 2007/0288710 A1  Dec. 13, 2007

(51) Int. Cl.
G06F 11/00 (2006.01)
(52) U.S. Cl. ...................................................... 714/13
(58) Field of Classification Search .................... 714/13
See application file for complete search history.

(56) References Cited

U.S. PATENT DOCUMENTS

| | | | | |
|---|---|---|---|---|
| 5,692,121 A * | 11/1997 | Bozso et al. | .................. | 714/13 |
| 5,699,415 A * | 12/1997 | Wagner | ....................... | 380/43 |
| 5,901,327 A * | 5/1999 | Ofek | ............................ | 710/5 |
| 5,926,816 A * | 7/1999 | Bauer et al. | .................... | 707/8 |
| 6,148,382 A * | 11/2000 | Bitner et al. | ............... | 711/162 |
| 6,535,994 B1 * | 3/2003 | Kedem | .......................... | 714/6 |
| 6,654,288 B2 * | 11/2003 | Kubiak | .................. | 365/185.22 |
| 6,654,909 B1 * | 11/2003 | Quach et al. | .................. | 714/30 |
| 6,845,428 B1 * | 1/2005 | Kedem | ....................... | 711/117 |

(Continued)

FOREIGN PATENT DOCUMENTS

EP   1 158 409 A   11/2001

(Continued)

OTHER PUBLICATIONS

International Search Report & Written Opinion dated Sep. 26, 2007 for Application No. PCT/EP2007/054824, filed May 18, 2007.

(Continued)

*Primary Examiner*—Scott T Baderman
*Assistant Examiner*—Yair Leibovich
(74) *Attorney, Agent, or Firm*—David W. Victor; Konrad Raynes & Victor LLP

(57) ABSTRACT

Provided are a method, system, and article of manufacture for mirroring data between a first site and a second site. Updates to segments of storage at the first site are copied to corresponding segments of storage at the second site. Codes are generated from the segments at the second site and a valid flag is provided for at least one code indicating whether the code for the segment of data is valid. One code is generated from each segment of storage at the first site. An operation is initiated to copy segments from the second site to the first site. A determination is made for segments at the second site as to whether the valid flag for the code for the segment at the second site indicates that the code is valid in response to initiating the copy operation. The valid code for at least one segment in the second site is compared with the code for the corresponding segment at the first site to determine whether to copy the data from the segment at the second site to the first site as part of the copy operation.

29 Claims, 6 Drawing Sheets

U.S. PATENT DOCUMENTS

| | | | |
|---|---|---|---|
| 2002/0016827 A1* | 2/2002 | McCabe et al. | 709/213 |
| 2004/0153642 A1* | 8/2004 | Plotkin et al. | 713/150 |
| 2004/0260899 A1 | 12/2004 | Kern et al. | |
| 2004/0268177 A1* | 12/2004 | Ji et al. | 714/6 |
| 2005/0015663 A1* | 1/2005 | Armangau et al. | 714/15 |
| 2005/0071386 A1 | 3/2005 | Wolfgang | |
| 2005/0273654 A1* | 12/2005 | Chen et al. | 714/13 |

FOREIGN PATENT DOCUMENTS

| | | |
|---|---|---|
| EP | 1 643 367 A | 4/2006 |
| GB | 2 341 959 A | 3/2000 |
| WO | 2005 029356 A | 3/2005 |

OTHER PUBLICATIONS

U.S. Patent Application entitled "Method, System, and Program for Data Synchronization", U.S. Appl. No. 10/671,295, filed Sep. 25, 2003, by inventors J.J. Wolfgang, K.W. Boyd, K.F. Day III, P.M. Dudas, and K.G. Dahman.

* cited by examiner

MIRRORING DATA BETWEEN PRIMARY AND SECONDARY SITES

BACKGROUND OF THE INVENTION

1. Field of the Invention

The present invention relates to a method, system, and program for mirroring data between primary and secondary sites.

2. Description of the Related Art

In typical disaster recovery solutions, data is housed at a primary site as well as at one or more secondary sites. These secondary sites maintain a synchronized copy of the data such that no data is lost in the case of a disaster at the primary site. If a disaster occurs, processing is either "failed-over" to one of the secondary sites or the data is copied from the secondary site back to the primary site. In order for disaster recovery to be effective, the secondary sites are typically geographically distant, i.e., in different cities, states, etc., from the primary site so that both sites are not affected by the same disaster.

Disaster recovery systems typically address two types of failures, a sudden catastrophic failure at a single point in time or data loss over a period of time. In the second type of gradual disaster, updates to volumes may be lost. For either type of failure, a copy of data may be available at a remote location. Such dual or shadow copies are typically made as the application system is writing new data to a primary storage device at a primary site.

In mirroring backup systems, data is maintained in volume pairs. A volume pair is comprised of a volume in a primary storage device and a corresponding volume in a secondary storage device that includes a consistent copy of the data maintained in the primary volume. Typically, the primary volume of the pair will be maintained in a primary storage control unit, and the secondary volume of the pair is maintained in a secondary storage control unit at a different physical location than the primary storage control unit. A storage control unit is a physical hardware unit that consists of a storage server integrated with one or more storage devices to provide storage capability to a host computer. A storage server is a physical unit that provides an interface between one or more storage devices and a host computer by providing the function of one or more logical subsystems. The storage server may provide functions that are not provided by the storage device. The storage server is composed of one or more clusters of storage devices. A primary storage control unit may be provided to control access to the primary storage and a secondary storage control unit may be provided to control access to the secondary storage.

When two geographically dispersed server farms are used to remotely mirror data for disaster recovery capability, there arises the performance problem of reestablishing mirroring after one of the sites has been down and now recovered. In such cases, the bulk of data between the two sites is identical with a small portion that has been changed at one site and not the other during the period of one site being down. Historically, to reestablish synchronization between the sites (reestablish mirroring) one site is chosen to be considered current and then all the data is copied to the other site. Due to the amount of data to move, this mirroring operation is a very time consuming process (on the order of weeks). State of the art practice to reduce this time is to take advantage of the fact that most of the data between the two sites is the same and a hash value is calculated on corresponding segments of data. If the hash values are identical, then the data can be assumed to be the same and does not need to be copied. This method greatly reduces the time for the resynchronization from the order of weeks to a day.

There is a need in the art for continued improvements to the resynchronization process.

SUMMARY

Provided are a method, system, and article of manufacture for mirroring data between a first site and a second site. Updates to segments of storage at the first site are copied to corresponding segments of storage at the second site. Codes are generated from the segments at the second site and a valid flag is provided for at least one code indicating whether the code for the segment of data is valid. One code is generated from each segment of storage at the first site. An operation is initiated to copy segments from the second site to the first site. A determination is made for segments at the second site as to whether the valid flag for the code for the segment at the second site indicates that the code is valid in response to initiating the copy operation. The valid code for at least one segment in the second site is compared with the code for the corresponding segment at the first site to determine whether to copy the data from the segment at the second site to the first site as part of the copy operation.

In a further embodiment, valid flags are provided for codes generated from segments at the first site, wherein the code for at least one segment in the second site is compared with the code for the corresponding segment at the first site if the valid flags for the corresponding segments at the first and second sites are valid.

In a further embodiment, a new code is generated for each segment whose valid flag indicates that the segment is invalid from current data for the segment. The new code for the segment at the second site is compared with the code for the corresponding segment at the first site to determine whether to copy the data from the segment at the second site to the first site.

In a further embodiment, data from the second site is copied to the first site if the codes do not match.

In a further embodiment, data is copied from the first site to the second site while the first site is receiving updates. Updates are received at the second site in response to detecting a failure at the first site, wherein updates are not received at the first site while updates are being received at the second site. An availability of the first site is detected after the failure at the first site, wherein the copy operation is initiated in response to detecting the availability of the first.

In a further embodiment, an update to one segment at the second storage site is received and the valid flag for the segment for which the update is received is set to indicate that the code is invalid. A new code is calculated for one segment whose valid flag is invalid and the valid flag for the segment for which the new code is calculated is set to indicate that the code for the segment is valid.

In a further embodiment, the received update is stored in a cache. Updates are destaged for one segment from the cache to the second site storage, wherein the new code is calculated for one segment in response to destaging the updates for the segment.

In a further embodiment, a determination is made as to whether the cache includes a previous update for the block to which the received update applies. The received update is written to the block in cache to overwrite any previous update to the block in the cache, wherein the valid flag for the segment is only set to indicate that the code is invalid in response to determining that there is no previous update for the block in the cache.

In a further embodiment, one segment at the second site is staged into the cache in response to receiving an update to a block in the segment, wherein updated and unchanged portions of the segment are in the cache, and wherein the new code is calculated from the entire segment stored in the cache in response to destaging the segment.

In a further embodiment, the received update is stored in a cache and updates for one segment are destaged from the cache to the first site storage. A background operation is initiated to calculate a new code for each segment whose valid flag indicates that the code is invalid.

Further provided are a method, system, and article of manufacture for mirroring data between a first site and a second site. Data is copied from segments of storage at the first site to corresponding segments of storage at the second site. Updates are received at the second site in response to detecting a failure at the first site, wherein updates are not received at the first site while updates are being received at the second site. An availability of the first site is detected before the first site is ready to begin receiving updates and mirroring updates to the second site. Operations are initiated to calculate codes for segments at the first and second sites in response to detecting the availability of the first site. A synchronize operation to copy segments from the second site to the first site is initiated in response to determining that the first site is ready to begin receiving updates and mirror updates to the second site. The valid codes for segments in the second site are compared with the codes for the corresponding segments at the first site to determine whether to copy the data from the segments at the second site to the first site as part of the synchronize operation.

In a further embodiment, at least one of the segments to the first site is restored from a backup device in response to detecting the availability of the first site, wherein the operations to calculate the code are initiated while segments are being restored from the backup device.

DETAILED DESCRIPTION

Figure 1:
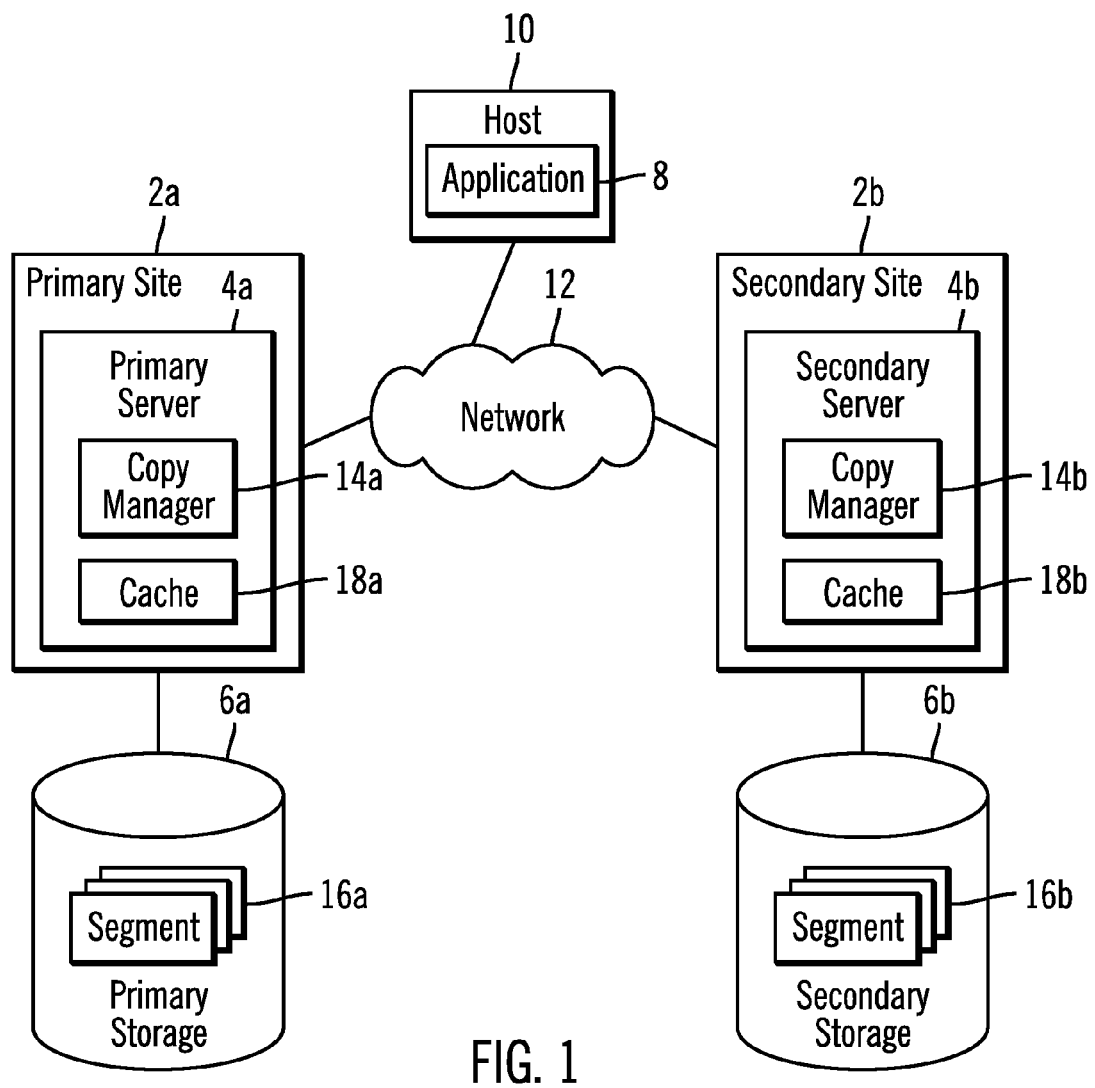
FIG. 1 illustrates an embodiment of a data mirroring computing environment.

FIG. 1 illustrates an embodiment of a network computing environment. A primary site 2a includes a primary server 4a coupled to a primary storage 6a and a secondary site 2b includes a secondary server 4b coupled to a secondary storage 6b. During normal operations, the primary server 4a receives updates and Input/Output (I/O) requests from an application 8 in a host system 10 over a network 12 (there may be multiple host systems 10 and applications 8 providing updates to the primary server 4a). At the same time, the primary server 4a synchronizes data over the network 12 at the primary storage 6a to a secondary server 4b that stores the data in the secondary storage 6b. The primary 4a and secondary 4b servers include copy manager programs 14a and 14b, respectively, that manage the mirror copy operations to allow the data at the primary site 2a to be mirrored at the secondary site 2b. In one embodiment, the storages 6a, 6b maintain data organized into recognized segments 16a, 16b, where a segment may comprise any unit of data, e.g., one or more tracks or blocks, a volume, a portion of a volume, a Logical Unit Number (LUN), etc. Further, each server 4a, 4b includes a cache 18a, 18b, comprising one or more volatile and/or non-volatile memory devices. The caches 18a, 18b cache updates received from the host 10 before the data is destaged to the storage 6a, 6b and caches data requested from the host 10.

The servers 4a, 4b may comprise enterprise storage servers, such as the IBM Enterprise Storage Server (ESS) or other suitable storage controllers known in the art. The copy managers 14a, 14b comprises applications designed to coordinate the mirroring, synchronization and resynchronization of data between a primary 2a and secondary 2b sites. In the described embodiments, the copy manager 14a, 14b is also described as performing general storage management operations, such as staging and destaging data from cache 18a, 18b. Thus, in described embodiments, the copy manager 14a, 14b may include code to perform storage operations unrelated specifically to mirroring. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, etc. The network 12 may comprise a Storage Area Network (SAN), Local Area Network (LAN), Intranet, the Internet, Wide Area Network (WAN), peer-to-peer network, wireless network, arbitrated loop network, etc. The network 12 may include one or more switches to provide one or more paths of communication between the different network 12 elements.

FIG. 1 shows that the primary 2a and secondary 2b sites each include one server 4a, 4b coupled to storages 6a, 6b. In additional embodiments, the sites 2a, 2b may include multiple servers coupled to multiple storage systems providing server farms.

Figure 2:
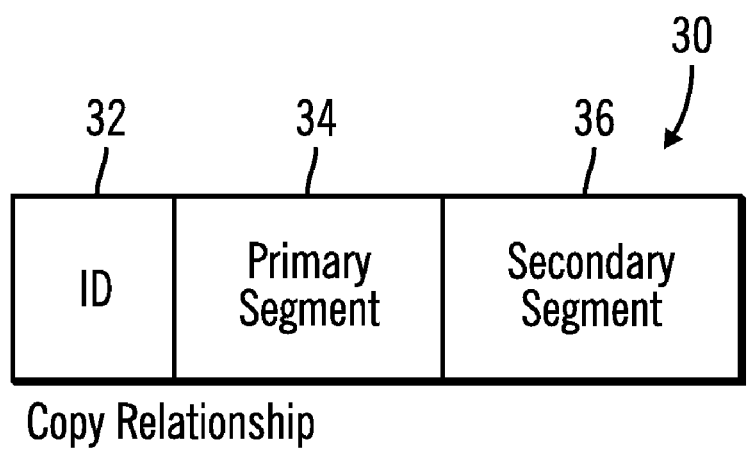
FIG. 2 illustrates an embodiment of a copy relationship associating primary and secondary segments at the primary and secondary sites.

FIG. 2 illustrates an embodiment of copy relationship information 30 the copy managers 14a, 14b maintain including an identifier (ID) 32 of the relationship, a primary segment 34 and a secondary segment 36, such that data at the identified primary segment 34 at the primary site 2a is mirrored to the identified secondary segment 36 at the secondary site 2b. The segment identification information 34 and 36 may identify the server at the primary 2a and secondary 2b sites managing access to the storage that includes the identified segment. Any segment in any storage in the primary site 2a may map to any corresponding segment in any storage at the secondary site 2b.

Figure 3:
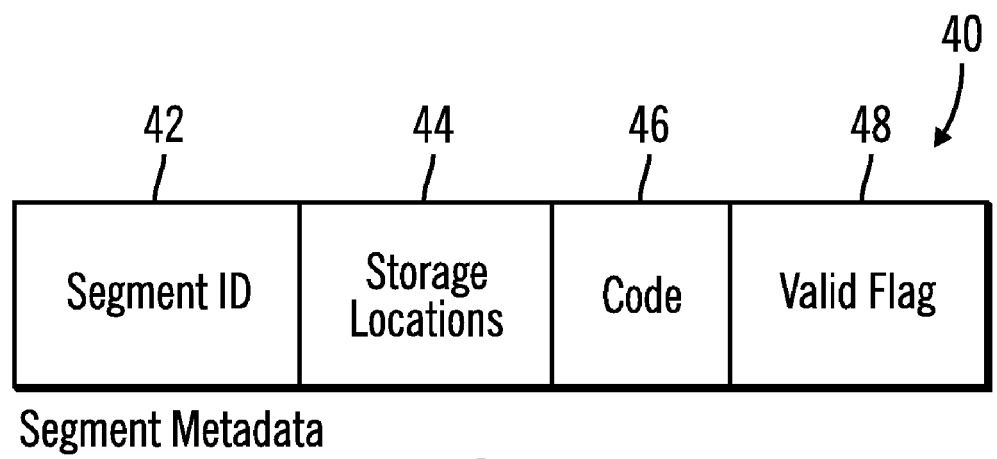
FIG. 3 illustrates an embodiment of segment metadata having information on segments of data at the primary and secondary sites.

FIG. 3 illustrates an embodiment of segment metadata 40 maintained for each segment 16a, 16b at the primary 2a and secondary 2b sites, including a segment identifier 42; the storage locations 44 where the segment data is stored, including an identifier of the server 4a, 4b and storage 6a, 6b in which the segment is maintained; a code 46 generated from all the data in the segment that provides a unique identifier of that data, e.g., a hash value; and a valid flag or bit 48 indicating whether the code 46 is valid. The valid flag 48 indicates the code 46 is invalid if data in the segment has been updated since the code 46 was last generated. The valid flag 48 may be used only for segments at the secondary site 2b or for segments at both sites 2a, 2b. The segment metadata 40 may be maintained at the primary 2a and/or secondary 2b sites or at a different third location in the network 12.

Figure 4:
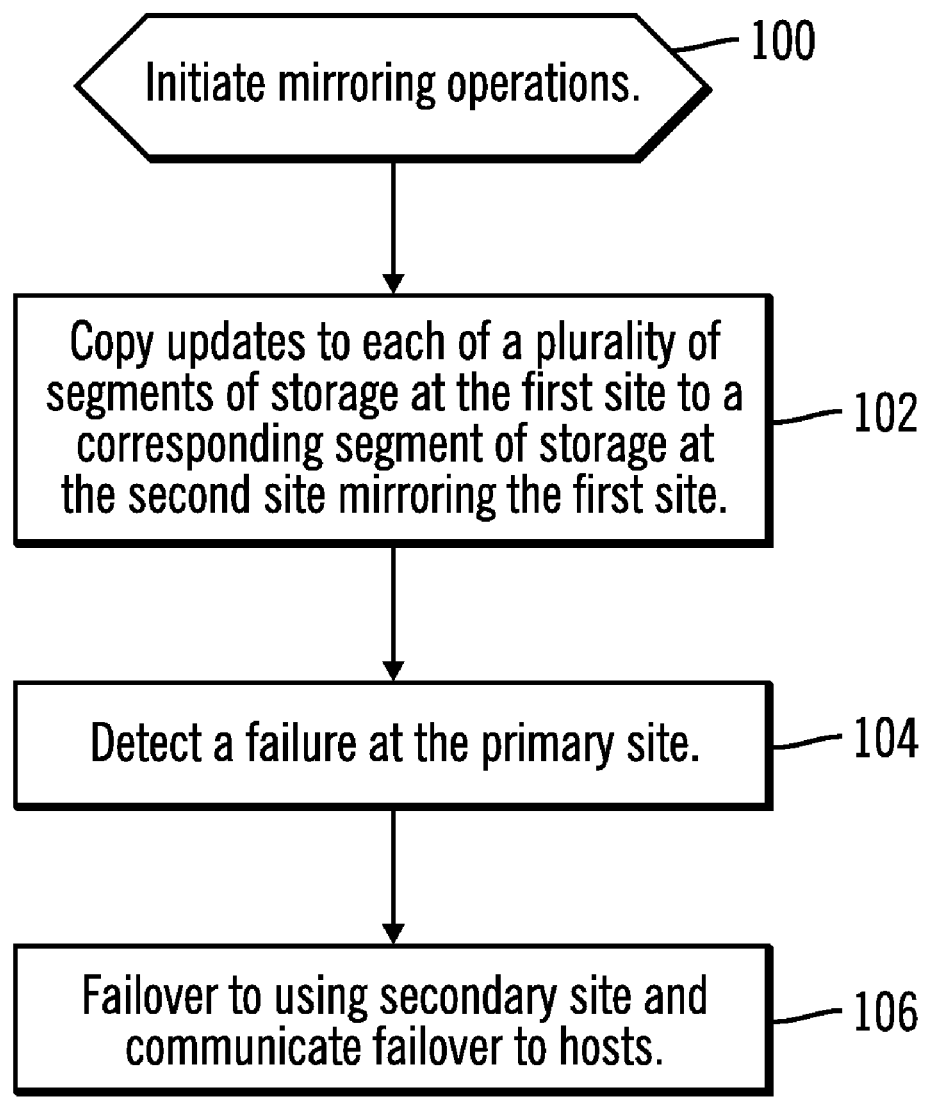
FIG. 4 illustrates an embodiment of mirroring operations.

FIG. 4 illustrates an embodiment of operations performed by the copy managers 14a, 14b to synchronize data and handle a failover. Upon initiating (at block 100) mirroring operations, the copy manager 14 copies (at block 102) updates (and initial data) to each of a plurality of segments 16a in the primary storage 6a at the first site 2a to a corresponding secondary segment 16b in the secondary storage 6b at the second site 2b mirroring the first site. A primary segment 34 has a corresponding segment 36 identified in the copy relationship 30 (FIG. 2). Upon detecting (at block 104) a failure at the primary site 2a, the copy managers 14a, 14b initiate (at block 106) a failover to use the secondary site and communicate the failover to the hosts 10 so that they may direct I/O requests to the secondary site 2a.

Figure 5:
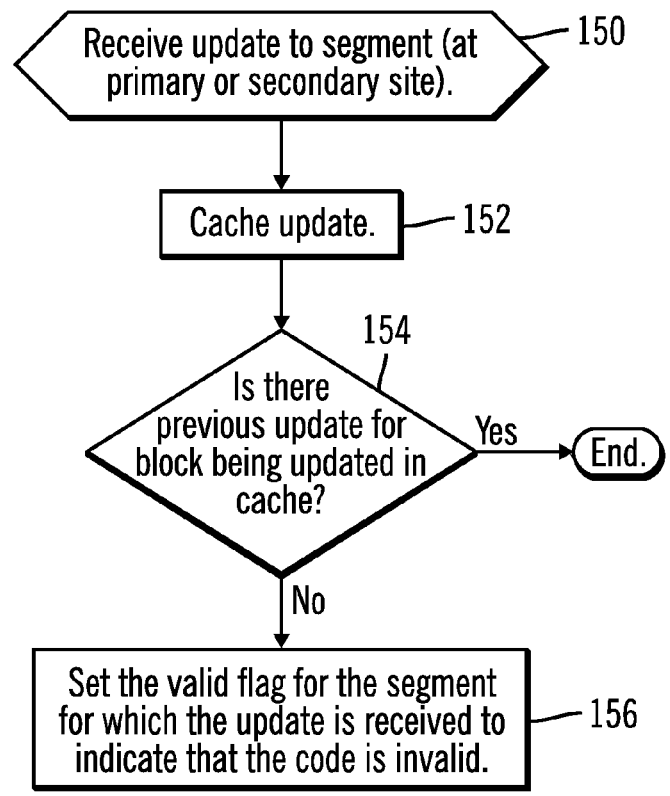
FIG. 5 illustrates an embodiment of operations to update a segment.

FIG. 5 illustrates an embodiment of operations performed by the copy managers 14a, 14b to process updates from the host 10. The primary server 4a handles I/O requests during normal operations and the secondary server 4b handles updates in a failover mode. Upon receiving (at block 150) an update to a segment 16a, 16b (at the primary 2a or secondary 2b site), the update is cached in cache 18a or 18b. If (at block 152) there is no previously received update for the block being updated already in the cache 18a, 18b, then the copy manager 14a, 14b sets (at block 154) the valid flag 48 (FIG. 3) for the segment 16a, 16b for which the update is received to indicate that the code 46 for the segment is invalid. If (at block 154) there is a previous update to the block, then control ends because the valid flag 48 would have been already set at the time of the previous update. In one embodiment, if the block being updated is not in cache 18a, 18b, then the copy manager 14a, 14b may stage into cache 18a, 18b the block being updated or the entire segment 16a, 16b including the block to update.

With the operations of FIG. 5, the code 46 for a segment 16a, 16b is indicated as invalid if a new update is received because the code 46 no longer reflects the current state of the segment.

Figure 6:
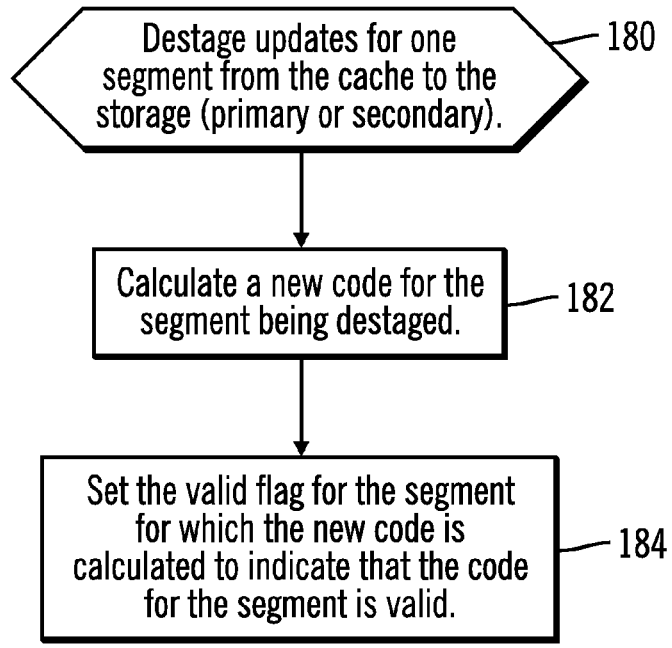
FIG. 6 illustrates an embodiment of operations to destage updates to segments from a cache.

FIG. 6 illustrates an embodiment of operations performed by the copy managers 14a, 14b to destage updates from the cache 18a, 18b to the storage 16a, 16b. Upon initiating (at block 180) an operation to destage updates for one segment 16a, 16b from the cache 18a, 18b to the storage 16a, 16b, the copy manager 14a, 14b calculates (at block 182) a new code 46 for the segment being destaged. The new code 46 may be generated from all current data for the segment 16a, 16b, including updates to the segment in the cache 18a, 18b and unchanged data in the storage 6a, 6b. In one embodiment, when an update is received to a portion of a segment 16a, 16b, the entire segment may be staged into the cache 18a, 18b. Alternatively, before destaging the data, unchanged data for a segment 16a, 16b that has updates in the cache 18a, 18b may be staged into the cache 18a, 18b to generate the code 46 (FIG. 4) for the segment. The code 46 may comprise a hash value or other unique value generated from the data in the segment 16a, 16b. The copy manager 14a, 14b further sets (at block 184) the valid flag 48 for the segment 16a, 16b for which the new code 46 is calculated to indicate that the current code 46 for the segment is valid.

With the described embodiments of FIG. 6, the code 46 is updated and generated when updates for a segment are destaged from the cache 18a, 18b.

In an alternative embodiment, the new code is calculated during a scheduled background operation, instead of in response to a destage operation. In such embodiments, the copy manager 14a, 14b locates segments whose valid bit 48 is set and then regenerates the code 46 based on the unchanged data in storage 6a, 6b and any updates to the storage in the cache 18a, 18b. Thus, the valid flag may be used to identify which segments need to have their code updated.

In a further embodiment, the code 46 may be updated when a segment is destaged from cache 18a, and then if the workload is heavy, the calculation of the code 46 is halted and the valid flag 48 is left to indicate that the code 46 is invalid. The code 46 may then be later recalculated during a scheduled destage or some other time when the workload is lower. This technique improves system performance by delaying the code recalculation to avoid overburdening the system during times of heavy usage.

Yet further, there may not be metatdata entries 40 (FIG. 3) covering all extents or segments due to limitations on the number of allowed metadata entries. In such case, if there is no metadata entry 40 for a segment, then such segment is treated is if it has a valid flag 48 set to indicate that the code 46 is invalid. Further, if the limit on the number of metadata entries 48 is reached while destaging, then the system may only update the code 46 for segments having a metadata entry 40.

Figure 7:
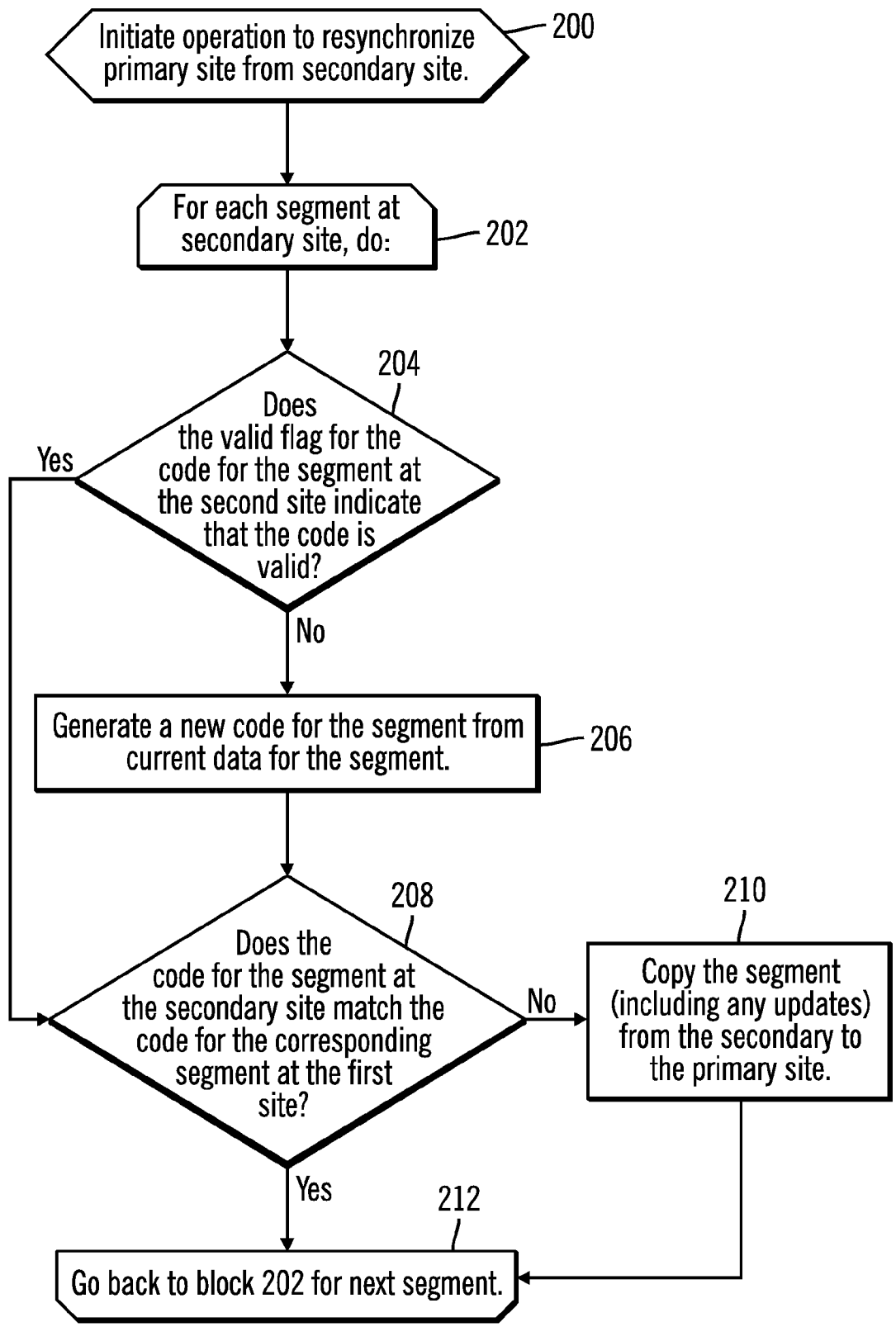
FIG. 7 illustrates an embodiment of operations to resynchronize from the secondary site to the primary site.

FIG. 7 illustrates an embodiment of operations performed by the copy manager 14a and/or 14b to resynchronize the data at the secondary site 2b to the primary site 2a once the systems at the primary site 2a are available. Upon initiating (at block 200) an operation to resynchronize the primary site 2a from the secondary site 2b, the copy manager 14a, 14b performs a loop of operations at blocks 202 through for 212 for each segment 16b at the secondary site 2b providing mirror data for the segments 16a at the primary site 2a. During the failover, segments 16b at the secondary site 2b may have been updated while the primary site 2a was down. For each segment, the copy manager 14a, 14b determines (at block 204) whether the valid flag 48 (FIG. 3) for the code 46 for the segment 16b at the secondary site 2b indicates that the code 46 is valid. If the code 46 is not valid, then the copy manager 14a, 14b generates (at block 206) a new code 46 for the segment 16b from current data (in cache 18b and/or storage 6b) for the segment 16a.

After generating the new code 46 (at block 206) or if (from the yes branch of block 204) the valid flag 48 indicates that the code 46 accurately reflects the current state of the segment 16b, then the copy manager 14a, 14b determines (at block 208) whether the code 46 for the segment 16b at the secondary site 2b matches the code 46 for the corresponding segment 16a at the first site 2a. If (at block 208) the codes 46 at the primary and secondary segment do not match, then the secondary segment has been updated and the segment (including any updates in cache 18b) are copied from the secondary 2b to the primary 2a site over the network 12. Otherwise, if the codes 46 for the primary and secondary segments match or after copying the segment from the secondary site 2b to the primary site 2a, i.e., resynchronization, control proceeds to block 212 to consider a next segment in the mirroring copy relationship 30. Once all segments are considered at the loop at blocks 202 through 212, control ends.

Either the primary 4a or secondary 4b server may perform the resynchronization operations in FIG. 7. In one embodiment, the valid flag 48 may only be maintained in the segment metadata 40 for segments in the secondary storage 6b. Alternatively, the segment metadata 40 for segments in the primary storage 6a may include a valid flag 48. If so, the operation at block 204 would have to check the valid flags 48 for the primary and corresponding secondary segments and if the valid flag 48 indicates that the code 46 is not up-to-date, then the code 46 is recalculated for the primary or secondary segment before the comparison is made at block 208.

Figure 8:
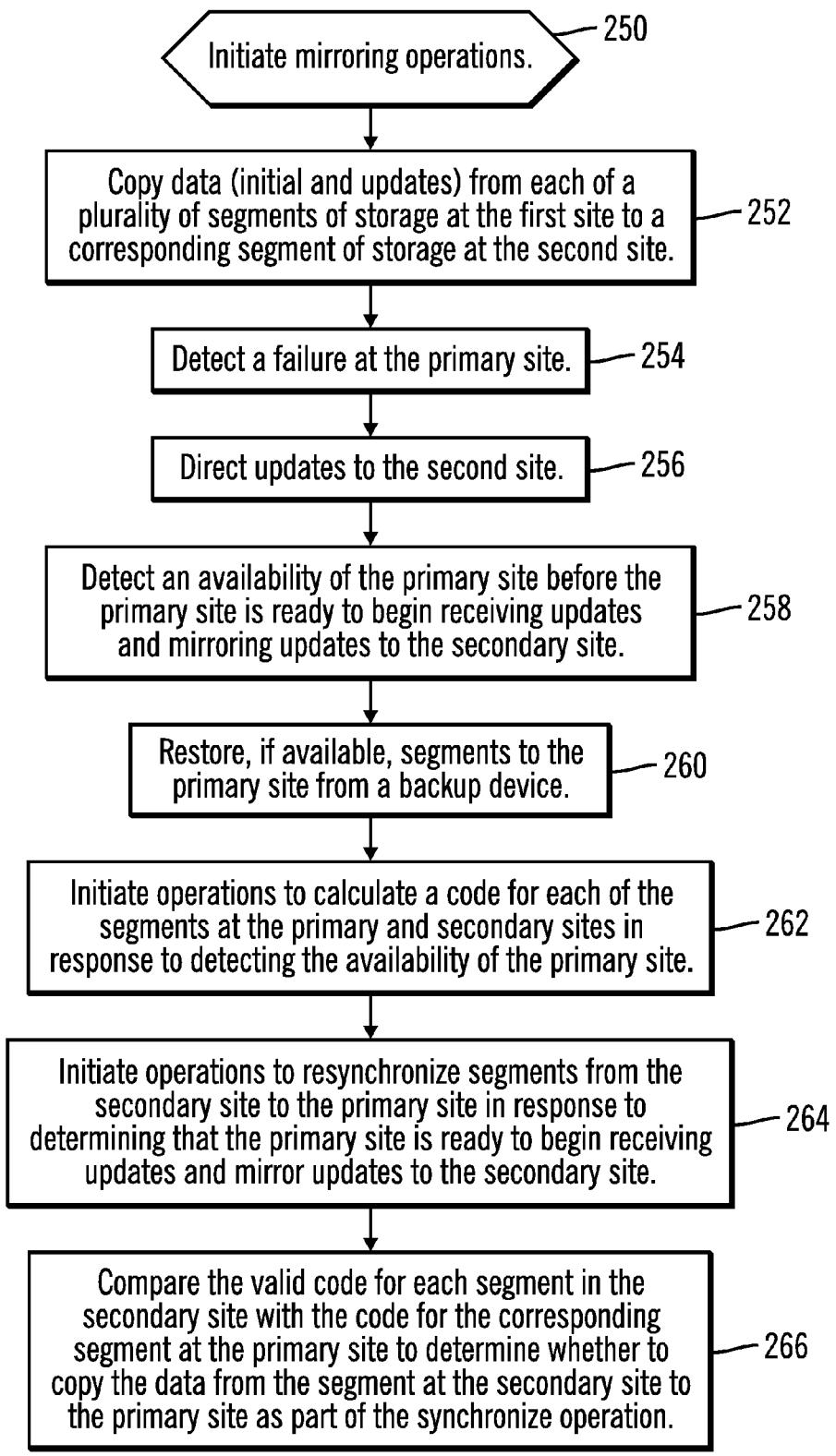
FIG. 8 illustrates an additional embodiment of mirror copying operations.

FIG. 8 illustrates an additional embodiment of mirroring operations performed by the copy manager 14a and/or 14b, wherein the code 46 (FIG. 3) for the primary and secondary segments are calculated as part of the resynchronization operation. Upon initiating (at block 250) mirroring operations, the primary copy manager 14a copies (at block 252) data (initial and updates) from each of a plurality of segments of storage at the primary site 2a to a corresponding segment of storage at the secondary site 2b as part of the synchronization operations performed while the primary site 2a is receiving I/O requests form the host 10.

Upon detecting (at block 254) a failure at the primary site 2a, which may comprise a failure of one of the components 4a, 6a, 14a or the connection to the network 12 (FIG. 1), host 10 updates are redirected (at block 256) to the secondary site 2b. The copy manager 14a, 14b may instruct the host 10 to direct I/O requests to the secondary site 2b during the failover. Upon detecting (at block 258) an availability of the primary site 2a before the primary site 2a is ready to begin receiving updates and mirroring updates to the secondary site 2b, the primary copy manager 14a may restore (at block 260), if available, segments to the primary site 2a from a backup device coupled to the primary server 4a directly at the primary site 2a or over the network 12. The copy managers 14a and/or 14b may then initiate (at block 262) operations to calculate the code 46 for each of the segments at the primary 2a and secondary 2b sites in response to detecting the availability of the primary site.

The secondary copy manager 14a initiates (at block 264) operations to resynchronize segments from the secondary site 2b to the primary site 2a in response to determining that the primary site 2a is ready to begin receiving updates and mirror updates to the secondary site 2b. The copy manager 14a, 14b then compares (at block 166) the valid code 46 for each segment in the secondary site 2a with the code for the corresponding segment at the primary site 2b to determine whether to copy the data from the segment 16b at the secondary site 2b to the primary site 2a as part of the resynchronize operation. If the codes do not match, then the data is copied from the secondary site 2b to the primary site 2a, because the secondary site 2b is assumed to have the most recent updates received during the failover of the primary site 2b. In one embodiment, if the codes match, then there is no need to copy the data from the secondary 2b to primary 2a site.

Described embodiments provide techniques for managing codes representing data that are used to determine whether to resynchronize data from a secondary site to a primary site. In the described embodiments, the codes may be calculated during a destage operation using a valid flag or calculated as part of a background operation using a valid flag.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices and components that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 through 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for synchronizing data between a primary storage managed by a primary server at a first site and a secondary storage managed by a secondary server at a second site, comprising:
    copying updates to segments of the primary storage at the first site to corresponding segments of the secondary storage at the second site as part of a first copy operation;
    providing codes generated from the segments in the secondary storage at the second site and a valid flag for at least one code indicating whether the code for the segment of data is valid;
    setting the valid flag to indicate one of the segments of data as invalid in response to receiving an update to the segment of data that results in the current code for the segment not reflecting the updated state of that segment;
    generating a new code for segments in the secondary storage whose valid flag indicates that the segment is invalid;
    setting the valid flag for the segment for which the new code is calculated to indicate that the code for the segment is valid;
    providing codes generated from segments of the primary storage at the first site;
    initiating a second copy operation to copy segments from the secondary storage at the second site to the primary storage at the first site;
    determining, for segments in the secondary storage at the second site, whether the valid flag for the code for the segment in the secondary storage at the second site indicates that the code is valid in response to initiating the second copy operation; and
    comparing the code for at least one of the segments in the secondary storage at the second site determined to be valid with the code for the corresponding segment in the primary storage at the first site to determine whether to copy the data from the segment in the secondary storage at the second site to the primary storage at the first site as part of the second copy operation.

2. The method of claim 1, further comprising:
    providing valid flags for codes generated from segments at the primary storage at the first site, wherein the code for at least one segment in the secondary storage at the second site is compared with the code for the corresponding segment in the primary storage at the first site if the valid flags for the corresponding segments in the primary and secondary storages at the first and second sites, respectively, indicate valid.

3. The method of claim 1, further comprising:
    generating a new code for each segment in the secondary storage whose valid flag indicates that the segment is invalid from current data for the segment; and
    comparing the new code for the segment in the secondary storage at the second site with the code for the corresponding segment in the primary storage at the first site to determine whether to copy the data from the segment in the primary storage at the second site to the primary storage at the first site in response to generating the new code.

4. The method of claim 1, further comprising:
    copying data from the secondary storage at the second site to the primary storage at the first site if the codes do not match.

5. The method of claim 4, further comprising
    copying data from the primary storage at the first site to the secondary storage at the second site while the first site is receiving updates;
    receiving updates at the secondary storage at the second site in response to detecting a failure at the first site, wherein updates are not received at the first site while updates are being received at the second site; and
    detecting an availability of the first site after the failure at the first site, wherein the copy operation is initiated in response to detecting the availability of the first site.

6. The method of claim 1, wherein the received update is stored in a cache, further comprising:
    destaging updates for one segment from the cache to the secondary storage at the second site, wherein the new code is calculated for one segment in response to destaging the updates for the segment.

7. The method of claim 6, further comprising:
    determining whether the cache includes a previous update for the block to which the received update applies; and
    writing the received update to the block in cache to overwrite any previous update to the block in the cache, wherein the valid flag for the segment is only set to indicate that the code is invalid in response to determining that there is no previous update for the block in the cache.

8. The method of claim 6, further comprising:
    staging one segment in the secondary storage at the second site into the cache in response to receiving an update to a block in the segment, wherein updated and unchanged portions of the segment are in the cache, and wherein the new code is calculated from the entire segment stored in the cache in response to destaging the segment.

9. The method of claim 1, wherein the received update is stored in a cache, further comprising:
    destaging updates for one segment from the cache to the primary storage at the first site storage; and initiating a background operation to calculate a new code for each segment whose valid flag indicates that the code is invalid.

10. A method for synchronizing data between a primary storage managed by a primary server at a first site and a secondary storage managed by a secondary server at a second site, comprising:
copying data from segments of the primary storage at the first site to corresponding segments of the secondary storage at the second site;
receiving updates at the secondary storage at the second site in response to detecting a failure at the first site, wherein updates are not received at the primary storage at the first site while updates are being received at the secondary storage at the second site;
detecting an availability of the first site before the first site is ready to begin receiving updates and mirroring updates to the secondary storage at the second site;
initiating operations to calculate codes for the segments at the primary and secondary storages at the first and second sites, respectively, in response to detecting the availability of the first site;
setting a valid flag to indicate one of the segments of data as invalid in response to receiving an update to the segment of data that results in the current code for the segment not reflecting the updated state of that segment;
generating a new code for segments in the secondary storage whose valid flag indicates that the segment is invalid;
setting the valid flag for the segment for which the new code is calculated to indicate that the code for the segment is valid;
initiating a synchronize operation to copy segments from the secondary storage at the second site to the primary storage at the first site in response to determining that the first site is ready to begin receiving updates and mirror updates to the secondary storage at the second site; and
comparing the codes for segments in the secondary storage at the second site with the codes for the corresponding segments in the primary storage at the first site to determine whether to copy the data from the segments in the secondary storage at the second site to the primary storage at the first site as part of the synchronize operation.

11. The method of claim 10, further comprising:
restoring at least one of the segments to the primary storage first site from a backup device in response to detecting the availability of the first site, wherein the operations to calculate the code are initiated while segments are being restored from the backup device.

12. A system for synchronizing data between a primary storage at a first site and a secondary storage at a second site, comprising:
a first system managing access to the primary storage at the first site;
a first copy manager program executed by the first system to perform operations comprising:
copying updates to segments of storage in the primary storage at the first site to corresponding segments of storage in the secondary storage at the second site as part of a first copy operation; and
providing codes generated from the segments of storage of the primary storage at the first site;
a second system managing access to the secondary storage at the second site; and
a second copy manager program executed by the second system to perform operations comprising:
providing codes generated from the segments in the secondary storage at the second site and a valid flag for at least one code indicating whether the code for the segment of data is valid;
setting the valid flag to indicate one of the segments of data as invalid in response to receiving an update to the segment of data that results in the current code for the segment not reflecting the updated state of that segment;
generating a new code for segments in the secondary storage whose valid flag indicates that the segment is invalid;
setting the valid flag for the segment for which the new code is calculated to indicate that the code for the segment is valid;
initiating a second copy operation to copy segments from the secondary storage at the second site to the primary storage at the first site;
determining, for segments in the secondary storage at the second site, whether the valid flag for the code for the segment in the secondary storage at the second site indicates that the code is valid in response to initiating the second copy operation; and
comparing the valid code for at least one of the segments in the secondary storage at the second site with the code for the corresponding segment in the primary storage at the first site to determine whether to copy the data from the segment in the secondary storage at the second site to the primary storage at the first site as part of the second copy operation.

13. The system of claim 12, wherein the first copy manager is executed to further provide valid flags for codes generated from segments in the primary storage at the first site, wherein the code for at least one segment in the secondary storage at the second site is compared with the code for the corresponding segment in the primary storage at the first site if the valid flags for the corresponding segments in the primary and secondary storages at the first and second sites, respectively, are valid.

14. The system of claim 12, wherein the first and second copy managers further generate a new code for each segment whose valid flag indicates that the segment is invalid from current data for the segment, and wherein the second copy manager further compares the new code for the segment in the secondary storage at the second site with the code for the corresponding segment in the primary storage at the first site to determine whether to copy the data from the segment in the secondary storage at the second site to the primary storage at the first site.

15. The system of claim 12, wherein the second copy manager further copies data from the secondary storage at the second site to the primary storage at the first site if the codes do not match.

16. The system of claim 12, further comprising:
a cache in the second system, wherein the received updates at the second system are stored in the cache, wherein the second copy manager further destages updates for one segment from the cache to the secondary storage at the second site storage, wherein the second copy manager calculates the new code for one segment in response to destaging the updates for the segment.

17. A system for synchronizing data between a primary storage at a first site and a secondary storage at a second site, comprising:
a first system managing access to the primary storage at the first site;

a second system managing access to the secondary storage at the second site;

a first copy manager executed by the first system and a second copy manager executed by the second system, wherein at least one of the first and second copy managers are executed to perform operations, the operations comprising:

copying data from segments of the primary storage at the first site to corresponding segments of the secondary storage at the second site;

receiving updates at the secondary storage at the second site in response to detecting a failure at the first site, wherein updates are not received at the primary storage at the first site while updates are being received at the secondary storage at the second site;

detecting an availability of the first site before the first site is ready to begin receiving updates and mirroring updates to the secondary storage at the second site;

initiating operations to calculate codes for the segments in the primary and secondary storages at the first and second sites, respectively, in response to detecting the availability of the first site;

setting a valid flag to indicate one of the segments of data as invalid in response to receiving an update to the segment of data that results in the current code for the segment not reflecting the updated state of that segment;

generating a new code for segments in the secondary storage whose valid flag indicates that the segment is invalid;

setting the valid flag for the segment for which the new code is calculated to indicate that the code for the segment is valid;

initiating a synchronize operation to copy segments from the secondary storage at the second site to the primary storage at the first site in response to determining that the first site is ready to begin receiving updates and mirror updates to the secondary storage at the second site; and comparing the codes for segments in the secondary storage at the second site with the codes for the corresponding segments in the primary storage at the first site to determine whether to copy the data from the segments in the secondary storage at the second site to the primary storage at the first site as part of the synchronize operation.

18. The system of claim 17, wherein the operations further comprise:

restoring at least one of the segments to the primary storage at the first site from a backup device in response to detecting the availability of the first site, wherein the operations to calculate the code are initiated while segments are being restored from the backup device.

19. An article of manufacture comprising a computer readable storage medium including program instructions implemented in a first and second copy managers for synchronizing data between a primary storage at a first site and a secondary storage at a second site, wherein at least one of the first and second copy managers are executed to perform operations, the operations comprising:

copying updates to segments of storage in the primary storage at the first site to corresponding segments of the secondary storage at the second site;

providing codes generated from the segments in the secondary storage at the second site and a valid flag for at least one code indicating whether the code for the segment of data is valid;

providing codes generated from segments of the primary storage at the first site;

setting a valid flag to indicate one of the segments of data as invalid in response to receiving an update to the segment of data that results in the current code for the segment not reflecting the updated state of that segment;

generating a new code for segments in the secondary storage whose valid flag indicates that the segment is invalid;

setting the valid flag for the segment for which the new code is calculated to indicate that the code for the segment is valid;

initiating an operation to copy segments from the secondary storage at the second site to the primary storage at the first site;

determining, for segments in the secondary storage at the second site, whether the valid flag for the code for the segment in the secondary storage at the second site indicates that the code is valid in response to initiating the copy operation; and comparing the valid code for at least one of the segments in the secondary storage at the second site with the code for the corresponding segment in the primary storage at the first site to determine whether to copy the data from the segment in the secondary storage at the second site to the primary storage at the first site as part of the copy operation.

20. The article of manufacture of claim 19, wherein the operations further comprise:

providing valid flags for codes generated from segments in the primary storage at the first site, wherein the code for at least one of the segments in the secondary storage at the second site is compared with the code for the corresponding segment in the primary storage at the first site if the valid flags for the corresponding segments in the primary and secondary storages at the first and second sites, respectively, indicate valid.

21. The article of manufacture of claim 19, wherein the operations further comprise:

generating a new code for each segment whose valid flag indicates that the segment is invalid from current data for the segment; and comparing the new code for the segment in the secondary storage at the second site with the code for the corresponding segment in the primary storage at the first site to determine whether to copy the data from the segment in the secondary storage at the second site to the primary storage at the first site.

22. The article of manufacture of claim 19, wherein the operations further comprise:

copying data from the secondary storage at the second site to the primary storage at the first site if the codes do not match.

23. The article of manufacture of claim 22, wherein the operations further comprise copying data from the primary storage at the first site to the secondary storage at the second site while the primary storage at the first site is receiving updates;

receiving updates at the secondary storage at the second site in response to detecting a failure at the first site, wherein updates are not received at the primary storage at the first site while updates are being received at the secondary storage at the second site; and detecting an availability of the first site after the failure at the first site, wherein the copy operation is initiated in response to detecting the availability of the first site.

24. The article of manufacture of claim 19, wherein the received update is stored in a cache, wherein the operations further comprise:

destaging updates for one segment from the cache to the secondary storage at the second site storage, wherein the new code is calculated for one segment in response to destaging the updates for the segment.

25. The article of manufacture of claim 24, wherein the operations further comprise:

determining whether the cache includes a previous update for the block to which the received update applies; and writing the received update to the block in cache to overwrite any previous update to the block in the cache, wherein the valid flag for the segment is only set to indicate that the code is invalid in response to determining that there is no previous update for the block in the cache.

26. The article of manufacture of claim 24, wherein the operations further comprise:

staging one segment in the secondary storage at the second site into the cache in response to receiving an update to a block in the segment, wherein updated and unchanged portions of the segment are in the cache, and wherein the new code is calculated from the entire segment stored in the cache in response to destaging the segment.

27. The article of manufacture of claim 19, wherein the received update is stored in a cache, wherein the operations further comprise:

destaging updates for one segment from the cache to the primary storage at the first site storage; and initiating a background operation to calculate a new code for each segment whose valid flag indicates that the code is invalid.

28. An article of manufacture comprising a computer readable storage medium including program instructions implemented in a first and second copy managers for synchronizing data between a primary storage at a first site and a secondary storage at a second site, wherein at least one of the first and second copy managers are executed to perform operations, the operations comprising:

copying data segments of storage in the primary storage at the first site to corresponding segments of storage in the secondary storage at the second site;

receiving updates to the secondary storage at the second site in response to detecting a failure at the first site, wherein updates are not received at the first site while updates are being received at the in the secondary storage at the second site;

detecting an availability of the first site before the first site is ready to begin receiving updates and mirroring updates to the secondary storage at the second site;

initiating operations to calculate codes for the segments in the primary and secondary storages at the first and second sites, respectively, in response to detecting the availability of the first site;

setting a valid flag to indicate one of the segments of data as invalid in response to receiving an update to the segment of data that results in the current code for the segment not reflecting the updated state of that segment;

generating a new code for segments in the secondary storage whose valid flag indicates that the segment is invalid;

setting the valid flag for the segment for which the new code is calculated to indicate that the code for the segment is valid;

initiating a synchronize operation to copy segments from the secondary storage at the second site to the primary storage at the first site in response to determining that the first site is ready to begin receiving updates and mirror updates to the secondary storage at the second site; and comparing the codes for segments in the secondary storage at the second site with the codes for the corresponding segments in the primary storage at the first site to determine whether to copy the data from the segments in the secondary storage at the second site to the primary storage at the first site as part of the synchronize operation.

29. The article of manufacture of claim 28, wherein the operations further comprise:

restoring at least one of the segments to the primary storage at the first site from a backup device in response to detecting the availability of the first site, wherein the operations to calculate the code are initiated while segments are being restored from the backup device.

* * * * *